United States Patent
Fair et al.

(10) Patent No.: US 9,940,062 B1
(45) Date of Patent: Apr. 10, 2018

(54) TECHNIQUE FOR CREATING A HISTORY OF TAPE MOVEMENT IN A VIRTUAL TAPE LIBRARY

(71) Applicants: Robert L. Fair, Cary, IN (US); Katrina M. Heiles, Durham, NC (US)

(72) Inventors: Robert L. Fair, Cary, IN (US); Katrina M. Heiles, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 212 days.

(21) Appl. No.: 13/889,196

(22) Filed: May 7, 2013

(51) Int. Cl.
*G06F 3/06* (2006.01)

(52) U.S. Cl.
CPC .................................. *G06F 3/0644* (2013.01)

(58) Field of Classification Search
CPC .. G06F 3/0601; G06F 11/1456; G06F 3/0686; G06F 3/0605
USPC .......................................................... 711/111
See application file for complete search history.

(56) References Cited

U.S. PATENT DOCUMENTS

| | | | | |
|---|---|---|---|---|
| 5,455,926 A * | 10/1995 | Keele | ..................... | G06F 3/0601 711/112 |
| 6,557,073 B1 * | 4/2003 | Fujiwara | ............... | G06F 3/0601 711/111 |
| 2002/0035664 A1 * | 3/2002 | Yates | ..................... | G06F 3/0605 711/111 |
| 2008/0040723 A1 * | 2/2008 | Haustein | ............... | G06F 3/0605 718/104 |
| 2008/0104350 A1 * | 5/2008 | Shimizu | ................ | G06F 3/0605 711/165 |
| 2009/0063765 A1 * | 3/2009 | Kottomtharayil | ..... | G06F 3/0619 711/112 |
| 2009/0282203 A1 * | 11/2009 | Haustein et al. | ............. | 711/162 |
| 2011/0145523 A1 * | 6/2011 | Gupta et al. | ................... | 711/159 |
| 2011/0320679 A1 * | 12/2011 | Ashton | ................... | G06F 12/02 711/4 |
| 2013/0151023 A1 * | 6/2013 | Taniyama | ..................... | 700/291 |
| 2014/0181396 A1 * | 6/2014 | Vincent | ......................... | 711/111 |

* cited by examiner

*Primary Examiner* — Trang K Ta
(74) *Attorney, Agent, or Firm* — Womble Bond Dickinson (US) LLP

(57) ABSTRACT

A method and system manages a virtual tape library history database. The method includes triggering an update of the virtual tape library history database in response to detecting a change related to a tape in a virtual tape library state table, where the update is asynchronous from processing of small computer system interface (SCSI) or command line interface (CLI) commands handled by a virtual tape library, and adding a record to a virtual tape history table in the virtual tape library history database, the virtual tape history table corresponding to the tape, where the record includes information about the change, where the virtual tape history table functions as a log of activity for the tape.

20 Claims, 5 Drawing Sheets

VTL STATE TABLE

| TAPE ID | BARCODE | POOL | LIBRARY | ELEMENT TYPE | ATTRIBUTE |
|---------|---------|------|---------|--------------|-----------|
| 0001 | 10011 | 1 | 1 | CAP | x, y, z |
| 0002 | 10010 | 1 | 2 | CAP | x, z |
| ⋮ | | | | | |

TECHNIQUE FOR CREATING A HISTORY OF TAPE MOVEMENT IN A VIRTUAL TAPE LIBRARY

FIELD

The embodiments relate to the management of a virtual tape library (VTL). Specifically, the embodiments relate to the management of history logs for each tape in the VTL.

BACKGROUND

Physical tape libraries have been used historically to store data, particularly in large scale data backup and retrieval systems. A physical tape library represents a collection of physical tapes (i.e., physical magnetic tapes). Often a physical tape library includes a large number of physical tapes, for example, thousands to hundreds of thousands of physical tapes. The physical tapes are housed and organized such that a robotic arm known as a picker can be used to select each physical tape from its slot and insert it into a physical tape drive under electronic control. The physical tape library may be coupled with a network and used for backup network data storage. Backup software applications and other software (e.g., on network coupled computers) may be configured to use such physical tape libraries.

One drawback to such physical tape libraries is that they rely on robotics and other mechanical components to function. As such, physical tape libraries tend to be relatively susceptible to malfunction (e.g., the robotic arms may break, the robot arms may drop physical tapes, etc.). However, existing backup applications and technology has been designed to use physical tape libraries. Often these backup programs are configured to interact with the physical tape libraries through the use of small computer system interface (SCSI) commands to direct the selection, loading, manipulation and writing of data to the physical tapes. Thus, recoding these programs to work with other types of storage systems would be costly and time consuming.

Virtual tape libraries provide an alternative to physical tape libraries. The virtual tape libraries appear to be physical tape libraries to the backup applications, and other software. These virtual tape libraries may emulate physical tape libraries including all of the SCSI commands utilized by the backup programs to interact with the physical tape libraries. However, the virtual tape libraries typically do not actually store the data on physical magnetic tapes, but rather store the data on one or more hard disk drive arrays, solid state storage devices, or other types of physical storage. This offers an advantage that the virtual tape libraries do not need to rely on the mechanical components, such as robotic arms used for physical tape libraries. Moreover, the backup applications, or other software utilizing the virtual tape library, do not need to know that physical magnetic tapes are not being used for data storage, and do not need to be changed. This helps to avoid modifying existing backup applications and technology that has been designed to use physical tape libraries. As a further advantage, the data stored by a backup application to a virtual tape may be stored as a file of a file system. As such, the virtual tape libraries are generally able to take advantage of advanced file system functionalities, such as improved ability to perform data deduplication, replication, redundancy, segmenting, and/or other file system based technologies.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description, numerous specific details are set forth, such as virtual tape functions, virtual tape state information, virtual tape library history management, orders of operations in flowcharts, component execution details, and similar specific details related to embodiments of the invention. However, it is understood that embodiments of the invention may be practiced without these specific details. In other instances, well-known circuits, structures and techniques have not been shown in detail in order not to obscure the understanding of this description.

Figure 1:
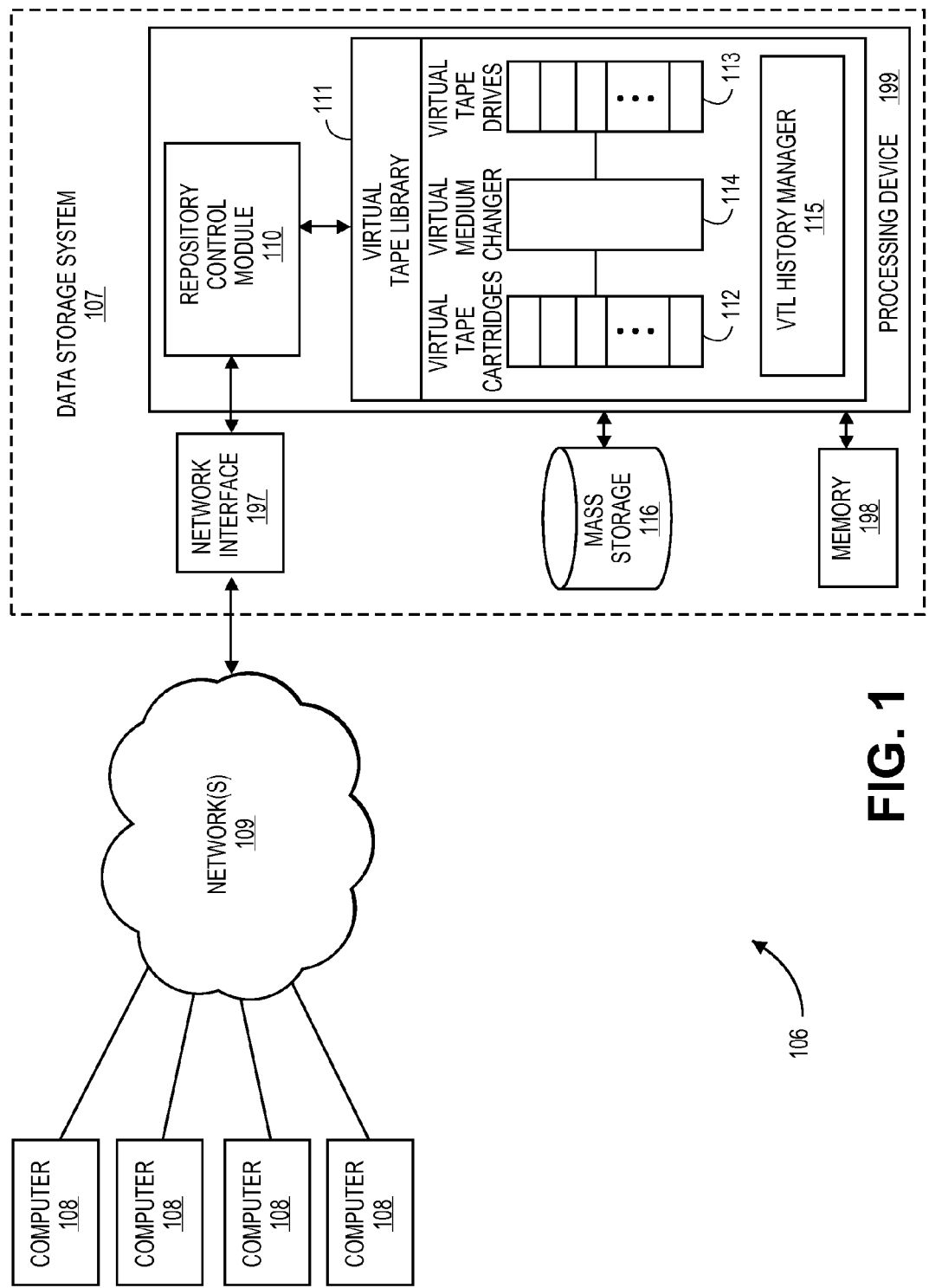
FIG. 1 is a block diagram of a network data storage system.

FIG. 1 is a block diagram of a network storage system 106 to backup or otherwise store data for a plurality of computers 108 that are coupled with the network storage system over one or more intervening networks 109. While in the illustration only four computers are shown, it is to be appreciated that there may be potentially a large number of such computers. Each of the computers may represent a desktop, workstation, server, portable, laptop, or other type of computer. The one or more intervening networks 109 may represent one or more public, private, local area, wide area, wired, wireless, hybrid, or other types of networks, or a combination of different types of networks. The scope of the invention is not limited to any known type of network.

The network storage system 107 includes a repository control module 110. The repository control module 110 can be implemented in software, firmware, hardware, or a combination thereof. The network storage system 107 also includes a virtual tape library 111. The virtual tape library includes a plurality of virtual tape cartridges 112, a plurality of virtual tape drives 113 to interface with the virtual tape cartridges, and a virtual medium changer 114 to virtually place virtual tape cartridges in the virtual tape drives 113. The repository control module can control or manage various different operational aspects of the network storage system 107 in a manner consistent with emulating a physical tape library system. In one embodiment, the repository control module 110 can control or manage storage of data in the virtual tape library 111, access to data in the virtual tape library 111 and similar operations.

Applications (e.g., backup applications, archive applications, or other software) on each of the computers 108 backup or otherwise store data on the network data storage system 107. The applications determine when to store data and transmit copies of the data over the one or more intervening network(s) to the network data storage system 107. The applications can also issue commands to access the data (e.g., read and/or write data). For example, the applications can transmit Small Computer System Interface (SCSI) commands to move access, read, write and otherwise manipulate the virtual tape cartridges. By way of example, the commands can represent moving a virtual tape to and from virtual tape drives or manipulation of the virtual medium changer.

Referring again to FIG. 1, the virtual tape library 111 includes an embodiment of a virtual history manager 115. As will be explained further below, the virtual history manager 115 tracks the usage of the virtual tape library 111 on a tape by tape basis while not significantly impacting the operation and performance of the virtual tape library, which must handle SCSI command execution in a timely manner.

The network storage system 107 also includes mass storage 116. Data of the virtual tape library may ultimately, often after additional processing (e.g., deduplication, redundancy, segmenting, etc.), be stored on the mass storage. Examples of suitable mass storage include, but are not limited to, one or more hard disk arrays, sets of magnetic disks, solid-state storage devices, physical tapes, other mass storage devices known in the arts, and combinations of such different types of mass storage. The mass storage can be either in the same or a different location as the virtual tape library depending on the particular implementation.

The network data storage system 107 can include a set of processing devices 199 and memory devices 198 that execute and store the code and data structures, respectively, that implement the virtual tape library 111 and other features of the network data storage system 107. A 'set,' as used herein refers to any positive whole number of items, including one item. The processing device 199 can be any type of processing device including a central processing unit, an application specific integrated circuit (ASIC) or similar type of processing device. Similarly, the memory 198 can be any type of storage device for use as working or persistent memory to store code and data structures of the virtual tape library 111 and similar data.

A virtual history manager 115 can perform a set of operations described further herein below that generate a history or log of the commands or actions taken by the virtual tape library. The collection of this history data can be utilized by other programs to monitor the operations of the virtual tape library, generate metrics and for similar uses. The virtual tape library history manager 115 records the operations asynchronously from the execution of the virtual tape library 111 to ensure that the virtual tape library 111 functions are not significantly delayed or impacted. The SCSI protocol requires relatively fast response times for the execution of SCSI commands. Thus, the virtual tape library 111 execution cannot be significantly slowed to meet the requirements of emulating the SCSI commands of the network data storage system 107.

Figure 2:
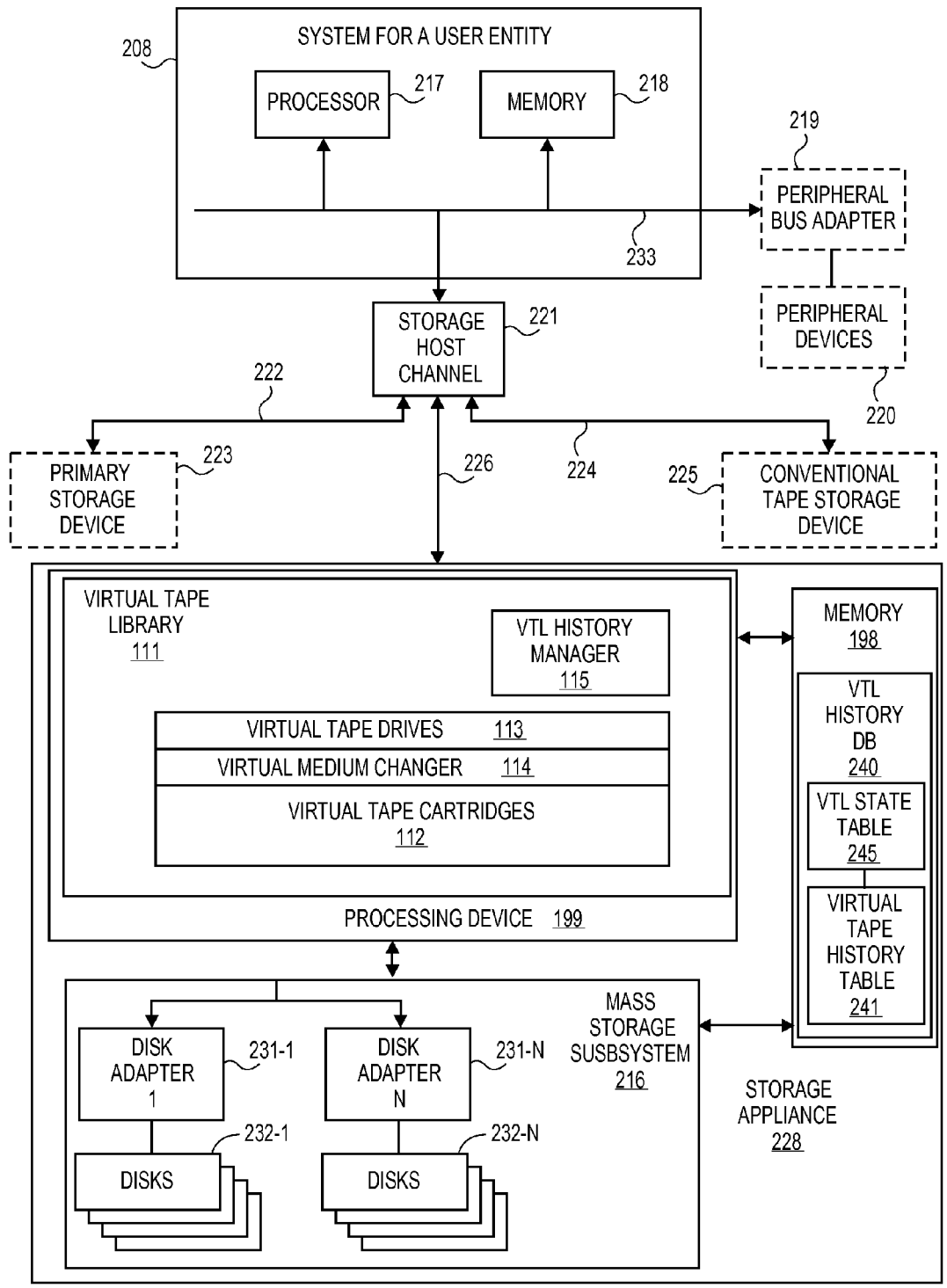
FIG. 2 is a block diagram of a virtual tape library (VTL) with VTL history management.

FIG. 2 is a block diagram of a data processing system 208 coupled to a storage appliance 228. The data processing 208 system may be a desktop, workstation, server, laptop, or other computer, or other type of data processing system. The data processing system has a processor 217 (e.g., a central processing unit (CPU)) coupled to an internal memory 218 (e.g., a Dynamic Random Access Memory (DRAM)) by an internal bus 233. A peripheral bus adapter or hub 219 coupled to the bus 233 provides a communications path for peripheral devices 220, such as printers, local terminals, local and wide area networks, displays, graphics, additional memory or storage and similar computer components.

A storage host controller or channel 221 coupled to the bus 233 provides communications paths to a variety of different storage media. This storage host controller or channel can communicate through a network adapter and/or directly through peripheral device busses. A first channel 222 can provide a communications path between the storage host channel and a primary storage device 223 (e.g., a magnetic disk storage unit or hard disk drive). The primary storage device can store an operating system, applications, software programs, local data, and similar information. A second channel 224 can provide a communications path between the storage host channel and a conventional physical magnetic tape storage device 225. A third channel 226 can provide a communications path between the storage host channel and the storage appliance 228.

The storage appliance includes a virtual tape library 111 coupled with a mass storage subsystem 216. A host or channel adapter, for example within the virtual tape library 111, is coupled with the storage host channel 221. The virtual tape library also includes virtual tape drives 113, a virtual medium changer 114, and virtual tape cartridges 112. The virtual tape library also includes a virtual tape library history manager 115 to track the operations of the virtual tape library 111.

Ultimately, data sent through the virtual tape library 111 can be stored on the mass storage subsystem 116. This can occur after file system related operations have been performed on the data (e.g., for deduplication, redundancy, redundant array of independent disks (RAID), etc.). In one embodiment, the storage appliance is a deduplication backup appliance and performs deduplication on the data, although this is not required. The illustrated embodiment of the mass storage system includes multiple disk adapters 231-1 through 231-N each having a corresponding array or set of magnetic or hard disks 232-1 through 232-N. Other embodiments can use other mass storage (e.g., a single set of hard disks, magnetic tape mass storage, semiconductor mass storage, other types of mass storage, combinations of different types of storage, etc.). This is just one illustrative example. Other embodiments may be used in either lesser (e.g., some of the illustrated components may be removed) and/or more equipped systems (e.g., additional components may be added).

As discussed above in regard to FIG. 1, FIG. 2 also illustrates that the virtual tape library 111 and its components are executed by a processor 199. The processor 199 is in communication with the mass storage subsystem 216 and the memory 198 of the storage appliance 228. The memory 198 can contain data storage for data structures and information utilized by the components executed by the processor 199. The data structures can include a VTL history database 240, which tracks the information of the virtual tape library 111 to enable the operation of the virtual tape library 111 and the logging of the operations of the virtual tape library 111 by the virtual tape library history manager 115. The VTL history database 240 can include a VTL state table 245 and a virtual tape history table 241. The structure of these tables is discussed further herein below. The VTL state table 245 stores the current state of the virtual tapes (i.e., virtual cartridges), virtual tape drives 113, and the virtual medium changer 114. The virtual tape history table 241 contains a set of tables on a tape by tape (i.e., cartridge by cartridge) basis with records or entries for each change or event related to the corresponding tape. In other embodiments, the VTL state table 245 and the virtual tape history table 241 can be stored in separate databases, data structures or at other locations.

The VTL history database 240 can be any type of database such as a relational database (e.g., a structured query language (SQL) based database), object oriented database or similar data storage structure. The databases can be directly controlled and manipulated by the virtual tape library 111 or by any component of the virtual tape library. In other embodiments, a database management program (e.g., SQLite) (not shown) is executed by the storage appliance in conjunction with the virtual tape library 111 to manage these databases. These databases can also be stored or have components that are stored in persistent storage devices and loaded into memory 198 to execute operations on these components of the database.

The virtual tape library history manager 115 records or logs the events that occur in the virtual tape library 111, such as the execution of commands and requests and the results of these execution. Commands or other requests to position a physical tape can be provided to the virtual tape library 111 from any system 208 connected to the virtual tape library 111. For example, they can be sent from computers to the storage appliance 228 over a network and received on a network interface of the storage appliance. The virtual tape library 111 can include command parser to parse the commands. In one example, the commands can be SCSI commands (e.g., a SPACE command) and the command parser can be a SCSI command parser. A virtual tape drive 113 is coupled with the command parser. A virtual tape cartridge 112 is coupled with the virtual tape drive 113. The virtual tape cartridge 112 can include a controller to control, manage, or facilitate use of the virtual tape cartridge 112

The virtual tape library 111 can also include a file system interface to interface with a file system of the storage appliance (e.g., a mass storage subsystem 216) or that is attached to the storage appliance. Data from the virtual tape library 111 can be stored as files (e.g., virtual tape files) in the memory 198 and through the file system. In various embodiments, the file system can support any one or more of various different types of file processing operations associated with network data storage. By way of example, the file system can include a deduplication module to perform deduplication, a replication module to perform replication, a snapshot module to perform a snapshot, and similar functions to facilitate the storage of the data handled by the virtual tape library 111. In some embodiments, data from the file system can be provided to a mass storage subsystem implemented as a redundant array of independent disks (RAID) system.

Figures 3A, 3B:
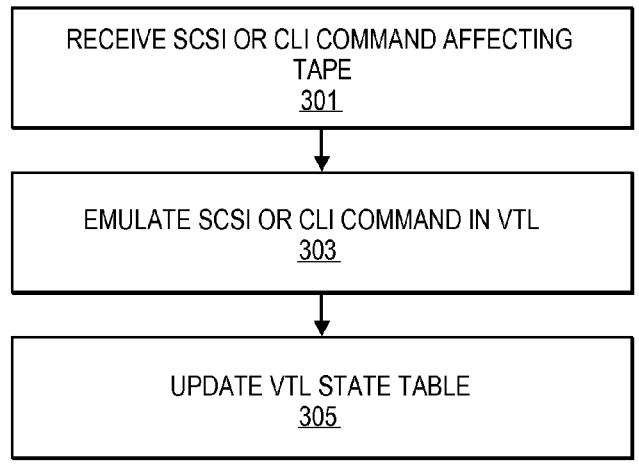
FIG. 3A is a flowchart of the VTL process.
FIG. 3B is a block diagram of a virtual tape state table.

FIG. 3A is a flowchart of the VTL process. This is a basic overview of the process. One skilled in the art would understand that additional implementation details have been omitted for sake of clarity so as not to obscure the features of the embodiments of the invention. The virtual tape library receives SCSI, command line interface (CLI) or similar commands from a user or a client computer system that affect a virtual tape administered by the virtual tape library (Block 301). The incoming command, e.g., a SCSI SPACE command, can be parsed and/or interpreted by the virtual tape library. The command can then be emulated by the virtual tape library such that a state of the virtual tape library is updated and any incoming data that is associated with the command is recorded in a virtual location within the virtual tape library, e.g., a particular tape residing at a particular location in the virtual tape library (Block 303 and 305). The virtual tape library can maintain a set of state tables or similar data structures that track the state of all of the virtual components that represent the physical components that the connected devices are configured to utilize. The information tracked can include a set of VTL state tables that track the current state and identification information for each of the virtual tapes in the virtual tape library.

FIG. 3B is a block diagram of a VTL state table that tracks the state of the virtual tapes in the virtual tape library. The illustrated VTL state table is provided by way of example and not limitation. A VTL state table can track any identification, state or similar information relevant for emulating a physical tape system. The VTL state table can also contain data that is related to features and functions specific to the virtual tape environment, such as enhancements to the data storage process (e.g., deduplication information) that is not present in the emulated standard physical tape backup system. Any number or structure of the virtual tape information can be stored and tracked. A separate VTL state table can be maintained for each virtual tape, or a larger table can track the information of each virtual tape.

In one example embodiment, the VTL state table (as shown in FIG. 3B) contains a set of records, with each record corresponding to a separate virtual tape. The virtual tapes can be identified by virtual tape identifiers (IDs). Other information tracked by the VTL state table for each virtual tape can include a barcode or similar identifier for the virtual tape, location information (e.g., such as pool or library information), and attribute information (such as element type, physical attributes, virtual attributes and similar information). Information relating the virtual tape to the data virtually stored in the virtual tape can also be maintained.

As commands are executed by the virtual tape library, the information related to each tape (i.e., the tape state) can be updated to provide a current view of all of the tapes of the virtual tape library and the virtual tape library components generally. Any aspect of the virtual tape library can have state information associated with it, depending on the information that is required to emulate a corresponding physical tape library.

Figures 4A, 4B:
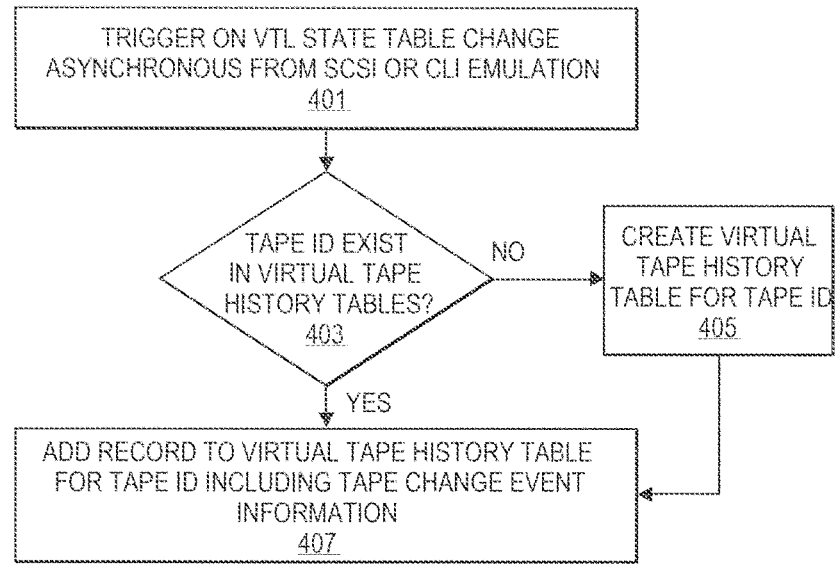
FIG. 4A is a block diagram of one embodiment of a VTL history management process.
FIG. 4B is a block diagram of virtual tape history table.

FIG. 4A is a block diagram of one embodiment of a VTL history management process. This is a general overview of the VTL history management process, additional details and embodiments are discussed further herein below. One skilled in the art would understand that specific features and details have been omitted to avoid obscuring the embodiments of the invention. In one embodiment, the process is triggered by an update to any VTL state table such as the VTL state table (Block 401). The trigger can be implemented in a database management program that is utilized to implement the tables being monitored or through a similar mechanism. In one example embodiment, the database management program is SQLite, which supports the definition of triggers that execute upon detection of defined actions within the SQLite databases. The monitoring of the trigger conditions and the execution of the actions in response to the trigger conditions are performed asynchronous to the execution of the received SCSI and/or CLI emulation. The SCSI and CLI commands are processed and executed by the components of the virtual tape library, while the monitoring of the state table changes is performed by the database management system independent of the virtual tape library operation. As a result, the operation of the virtual tape library to process the SCSI and CLI commands, which can be time and resource sensitive, is not significantly limited by the virtual tape library history functions.

The triggered events can be defined or configured by a user or pre-defined by the virtual tape library history manager. A trigger can call operations of the virtual tape library history manager or the operations can be partially or primarily executed by the database management system as configured by or as controlled by the virtual tape library history manager. The operations can include a check whether a tape identifier corresponding to a triggered record in the state tables, such as the VTL state tables, exists in virtual tape history tables, which include entries that function as log entries for the activities that are recorded for each virtual tape as identified by the virtual tape identifier.

If the virtual tape identifier is not found in the virtual tape history tables, then the virtual tape history table for the tape identifier is created (Block 405). The virtual tape history tables, as discussed above can be part of a virtual tape history table or similarly stored in a database and accessible through a database management system. In some embodiments, the monitored VTL state tables can also be considered part of the virtual tape history table or similarly stored in a database by a database management system. Where the virtual tape history table already exists for a virtual tape identifier tied to an update of the virtual tape state tables, then the process proceeds to the update of the virtual tape history table.

Whether created or already existing, once located or created the virtual tape history table for the virtual tape identifier that has been updated causing the trigger to be executed is updated to include a new record or entry including information about the triggering event, such as a change to the virtual tape state table (Block 407). The update can include any amount of contextual or descriptive information related to the change to the virtual tape state table. The information can be included in a single record or set of records. In other embodiments, the data can have any structure or organization such that sufficient information and organization has been utilized to enable history information and metrics to be derived from the records.

FIG. 4B is a block diagram of virtual tape history table. The virtual tape history table content and schema is provided by way of example and not limitation. One skilled in the art would understand that the information stored in the virtual tape history table can include other information relevant to the operation of the virtual tape library and the changes to virtual tapes, specifically to recording temporal changes to this data in the form of records or log entries. In the example, the virtual tape history table contains a set of fields including a record identifier, which uniquely or locally identifies each record in a virtual tape history table, location information, time or date information (e.g., a timestamp), event description information, and similar information relevant to the activity triggering the change to the VTL state table. The virtual tape history database can include any number of virtual tape history tables or the virtual tape history table can include any number of sub-tables or records corresponding to particular virtual tapes. The tables for the individual tables then include entries for each event. In some embodiments, the number of records can be limited to prevent performance degradation and to limit resource requirements. A process for purging or otherwise removing records and data from the virtual tape history table is described herein below.

Figure 5:
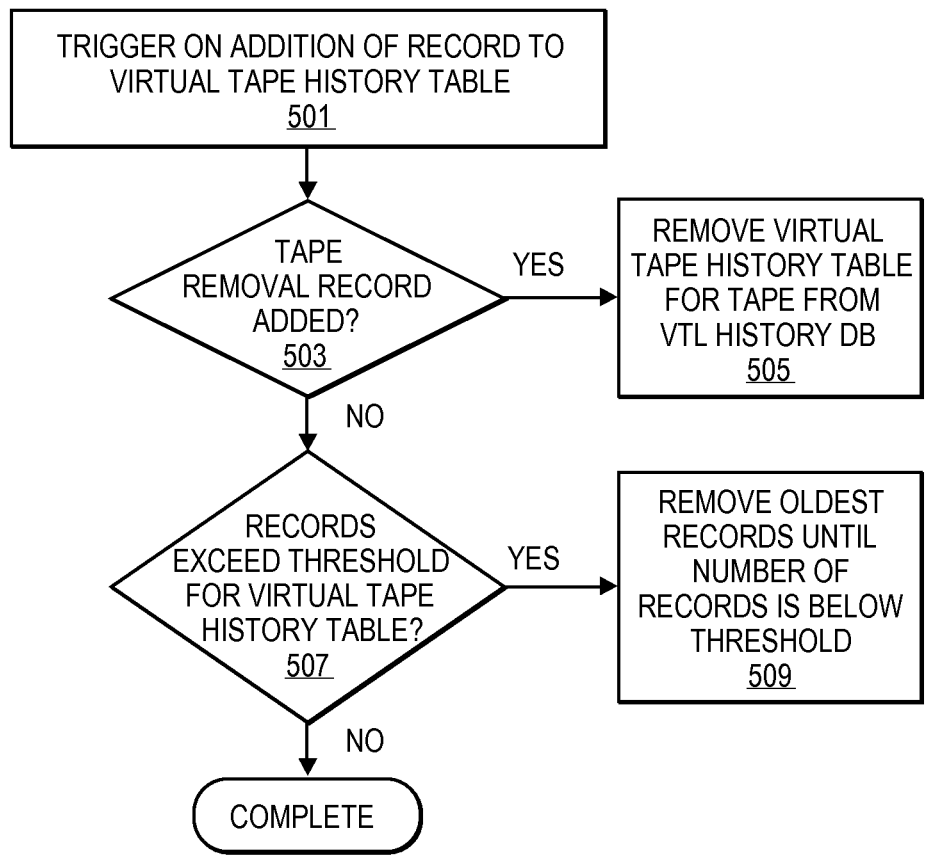
FIG. 5 is a flowchart of one embodiment of a VTL history purge process.

FIG. 5 is a flowchart of one embodiment of a VTL history purge process. To limit the necessary resources in terms of computational resources, memory and storage, the size of the virtual tape history table can be limited to a set number of records per virtual tape. The limit or threshold can have any setting as determined by the administrators or users of the system. In one example embodiment, the number of records can be limited to fifty records per virtual tape. When the number of records exceeds a threshold, the purge process reduces the number of records and also the entire set of records for a virtual tape can be removed when the virtual tape is considered to have been discarded.

In one embodiment, this process can be initiated in response to a trigger that is defined in relation to the virtual tape history table (Block 501). As with the triggers described above in regard to the VTL state table, those that are defined to monitor changes to the virtual tape history tables can also be implemented to execute and detect changes independent of and asynchronously to other operations of the virtual tape library, such as the general processing of the SCSI and CLI commands. These operations can also be implemented by any combination of the virtual tape library and the database management system.

Upon detecting a change to the virtual tape history table, a check can be made to determine whether the operation that triggered the change to the virtual tape history table was a tape removal record (or similar type of record) that indicates that the corresponding virtual tape was removed from the virtual tape library (Block 503). If such a record is detected, then the corresponding virtual tape history table can be deleted from the VTL history database to conserve storage space (Block 505). If the added record is not related to a virtual tape removal or similar event, then the process continues to check the record thresholds.

For a virtual tape history table corresponding to a triggered change, a check can be made whether a number of records in the virtual tape history table exceeds a defined threshold (Block 507). The threshold can be configured to be any value or a range of values by an administrator, user or pre-programming. If the threshold has been exceeded by the addition of new records to the virtual tape history table, then the process can proceed to remove the oldest records in the virtual tape history table until the number of records fall below the threshold (Block 509). In one embodiment, the number of records removed can exceed that which is required to just fall within the threshold, instead remove any number of additional records to prevent continuous purging operations to be executed, for example the number of records can be reduced by a fixed number under the threshold or a particular percentage below the threshold. If the number of records does not exceed the threshold, then the process can complete.

In the description and claims, the terms "coupled" and/or "connected," along with their derivatives, have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

One or more embodiments include an article of manufacture (e.g., a computer program product) that includes a machine-accessible and/or machine-readable medium. The medium may include a mechanism that provides, for example stores or transmits, information in a form that is accessible and/or readable by the machine. The machine-accessible and/or machine-readable medium may provide, or have stored thereon, a sequence of instructions that if executed by a machine cause or result in the machine performing one or more operations, methods, or techniques disclosed herein.

In one embodiment, the machine-readable medium may include a tangible non-transitory machine-readable storage media. For example, the tangible non-transitory machine-readable storage media may include a floppy diskette, an optical storage medium, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, or a combinations thereof. The tangible medium may include one or more solid or tangible physical materials, such as, for example, a semiconductor material, a phase change material, a magnetic material, etc.

In another embodiment, the machine-readable media may include a non-tangible transitory machine-readable communication medium. For example, the transitory machine-readable communication medium may include electrical, optical, acoustical or other forms of propagated signals, such as carrier waves, infrared signals, digital signals, etc.)

Examples of suitable machines include, but are not limited to, computer systems, desktops, laptops, network elements, storage appliances, equipment of remote archive repositories, and other electronic devices, equipment, elements, or systems having one or more microprocessors. Such electronic devices typically include one or more processors coupled with one or more other components, such as one or more storage devices (non-transitory machine-readable storage media), user input/output devices (e.g., a keyboard, a touchscreen, and/or a display), and/or network connections. The coupling of the processors and other components is typically through one or more buses/interconnects and bridges (also termed bus controllers). Thus, the storage device of a given electronic device may store code and/or data for execution on the one or more processors of that electronic device.

It should also be appreciated that reference throughout this specification to "one embodiment," "an embodiment," or "one or more embodiments," for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method for managing a virtual tape library history database, the method comprising:
   in response to detecting a change related to a first tape of a plurality of tapes represented in a virtual tape library state table, triggering an update of a first state entry of the virtual tape library state table associated with the first tape, wherein the triggering is implemented by a database management system that manages the virtual tape library history database and monitors the change related to the first tape, wherein monitoring the change and updating the first state entry are performed independently of and asynchronously to other virtual tape library operations, and wherein the virtual tape library state table includes a plurality of state entries, each state entry corresponding to one of a plurality of virtual tapes, wherein each state entry includes a virtual tape identifier identifying the corresponding virtual tape, a unique barcode identifying the corresponding virtual tape, a pool identifier identifying which of a plurality of pools of tapes the corresponding virtual tape belongs to, a library identifier identifying which of libraries the corresponding virtual tape belongs to, and one or more attributes associated with the corresponding virtual tape, wherein the virtual tape library state table stores information for all of the plurality of tapes;
   in response to updating the first state entry of the virtual tape library state table, identifying a first virtual tape history table corresponding to the first tape based on a first virtual tape identifier that identifies the first tape, the first virtual tape history table being one of the plurality of virtual tape history tables, each virtual tape history table corresponding to one of the plurality of tapes, wherein the virtual tape library state table and the first virtual tape history table are separate tables; and adding a record to the first virtual tape history table in the virtual tape library history database, wherein the added record includes information about the updated first state entry of the virtual tape library state table, wherein the first virtual tape history table includes a plurality of history entries, each history entry corresponding to one of a plurality of events based on an update of an attribute of a first state entry of the virtual tape library state table corresponding to the first tape, and wherein each history entry includes a timestamp at which an associated event occurred, a location of the event which includes a pool identifier identifying a pool of virtual tapes in which the corresponding event occurred, and a library identifier identifying a virtual library, wherein the virtual tape library state table and the first virtual tape history table are maintained in a system memory of a storage appliance.

2. The method of claim 1, further comprising:
checking whether a virtual tape history table with a tape identifier of the first tape exists in the virtual tape history database.

3. The method of claim 2, further comprising:
creating the virtual tape history table, in response to the tape identifier not being found in the virtual tape history database.

4. The method of claim 1, further comprising:
triggering a purge operation for the virtual tape history table in response to the adding of the record to the virtual tape history table.

5. The method of claim 4, further comprising:
checking whether the record indicates that the first tape has been removed from the virtual tape library.

6. The method of claim 5, further comprising:
removing the virtual tape history table in response to the first tape being removed from the virtual tape library.

7. The method of claim 1, further comprising:
checking whether a number of records exceeds a threshold for the virtual tape history table of the first tape.

8. The method of claim 7, further comprising:
removing a set of oldest records in the virtual tape history table to reduce the number of records below the threshold.

9. A computer system comprising:
a memory; and
at least one processor coupled with the memory, the processor configured to execute a virtual tape library history manager, the virtual tape library history manager
to in response to detecting a change related to a first tape of a plurality of tapes represented in a virtual tape library state table maintained in the memory, triggering an update of a first state entry of the virtual tape library state table associated with the first tape, wherein the triggering is implemented by a database management system that manages the virtual tape library history database and monitors the change related to the first tape, wherein monitoring the change and updating the first state entry are performed independently of and asynchronously to other virtual tape library operations, and wherein the virtual tape library state table includes a plurality of state entries, each state entry corresponding to one of a plurality of virtual tapes, wherein each state entry includes a virtual tape identifier identifying the corresponding virtual tape, a unique barcode identifying the corresponding virtual tape, a pool identifier identifying which of a plurality of pools of tapes the corresponding virtual tape belongs to, a library identifier identifying which of libraries the corresponding virtual tape belongs to, and one or more attributes associated with the corresponding virtual tape, wherein the virtual tape library state table stores information for all of the plurality of tapes, in response to updating the first state entry of the virtual tape library state table, to identify a virtual tape history table loaded in the memory and corresponding to the first tape based on a first virtual tape identifier that identifies the first tape, the first virtual tape history table being one of the plurality of virtual tape history tables, each virtual tape history table corresponding to one of the plurality of tapes, wherein the virtual tape library state table and the first virtual tape history table are separate tables, and to add a record to the first virtual tape history table in the virtual tape library history database, wherein the added record includes information about the updated first state entry of the virtual tape library state table, wherein the first virtual tape history table includes a plurality of history entries, each history entry corresponding to one of a plurality of events based on an update of an attribute of a first state entry of the virtual tape library state table corresponding to the first tape, and wherein each history entry includes a timestamp at which an associated event occurred, a location of the event which includes a pool identifier identifying a pool of virtual tapes in which the corresponding event occurred, and a library identifier identifying a virtual library.

10. The system of claim 9, wherein the virtual tape library history manager is configured to check whether a virtual tape history table with a tape identifier of the first tape exists in the virtual tape history database.

11. The system of claim 10, wherein the virtual tape library history manager is configured to create the virtual tape history table, in response to the tape identifier not being found in the virtual tape history database.

12. The system of claim 9, wherein the virtual tape library history manager is configured to trigger a purge operation for the virtual tape history table in response to the adding of the record to the virtual tape history table.

13. A non-transitory computer-readable medium, having instructions stored therein, which when executed cause a computer to perform a set of operations comprising:
in response to detecting a change related to a first tape of a plurality of tapes represented in a virtual tape library state table, triggering an update of a first state entry of the virtual tape library state table associated with the first tape, wherein the triggering is implemented by a database management system that manages the virtual tape library history database and monitors the change related to the first tape, wherein monitoring the change and updating the first state entry are performed independently of and asynchronously to other virtual tape library operations, and wherein the virtual tape library state table includes a plurality of state entries, each state entry corresponding to one of a plurality of virtual tapes, wherein each state entry includes a virtual tape identifier identifying the corresponding virtual tape, a unique barcode identifying the corresponding virtual tape, a pool identifier identifying which of a plurality of pools of tapes the corresponding virtual tape belongs to, a library identifier identifying which of libraries the corresponding virtual tape belongs to, and one or more attributes associated with the corresponding virtual tape;

in response to updating the first state entry of the virtual tape library state table, identifying a virtual tape history table corresponding to the first tape based on a first virtual tape identifier that identifies the first tape, the first virtual tape history table being one of the plurality of virtual tape history tables, each virtual tape history table corresponding to one of the plurality of tapes, wherein the virtual tape library state table and the first virtual tape history table are separate tables; and adding a record to the first virtual tape history table in the virtual tape library history database, wherein the added record includes information about the updated first state entry of the virtual tape library state table, wherein the first virtual tape history table includes a plurality of history entries, each history entry corresponding to one of a plurality of events based on an update of an attribute of a first state entry of the virtual tape library state table corresponding to the first tape, and wherein each history entry includes a timestamp at which an associated event occurred, a location of the event which includes a pool identifier identifying a pool of virtual tapes in which the corresponding event occurred, and a library identifier identifying a virtual library, wherein the virtual tape library state table and the first virtual tape history table are maintained in a system memory of a storage appliance.

14. The non-transitory computer-readable medium of claim 13, having stored therein further instructions, which when executed cause the computer to perform further operations comprising:

checking whether a virtual tape history table with a tape identifier of the first tape exists in the virtual tape history database.

15. The non-transitory computer-readable medium of claim 14, having stored therein further instructions, which when executed cause the computer to perform further operations comprising:

creating the virtual tape history table, in response to the tape identifier not being found in the virtual tape history database.

16. The non-transitory computer-readable medium of claim 13, having stored therein further instructions, which when executed cause the computer to perform further operations comprising:

triggering a purge operation for the virtual tape history table in response to the adding of the record to the virtual tape history table.

17. The non-transitory computer-readable medium of claim 16, having stored therein further instructions, which when executed cause the computer to perform further operations comprising:

checking whether the record indicates that the first tape has been removed from the virtual tape library.

18. The non-transitory computer-readable medium of claim 17, having stored therein further instructions, which when executed cause the computer to perform further operations comprising:

removing the virtual tape history table in response to the first tape being removed from the virtual tape library.

19. The non-transitory computer-readable medium of claim 13, having stored therein further instructions, which when executed cause the computer to perform further operations comprising:

checking whether a number of records exceeds a threshold for the virtual tape history table of the first tape.

20. The non-transitory computer-readable medium of claim 19, having stored therein further instructions, which when executed cause the computer to perform further operations comprising:

removing a set of oldest records in the virtual tape history table to reduce the number of records below the threshold.

\* \* \* \* \*